United States Patent
Rao (10) Patent No.: US 9,210,088 B2
(45) Date of Patent: Dec. 8, 2015

(54) PROVIDING NETWORK-WIDE ENHANCED LOAD BALANCING

(71) Applicant: Cisco Technology, Inc., San Jose, CA (US)

(72) Inventor: Dhananjaya Rao, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 252 days.

(21) Appl. No.: 13/834,479

(22) Filed: Mar. 15, 2013

(65) Prior Publication Data
US 2014/0269268 A1 Sep. 18, 2014

(51) Int. Cl.
*H04L 12/803* (2013.01)
*H04L 29/08* (2006.01)

(52) U.S. Cl.
CPC .......... *H04L 47/125* (2013.01); *H04L 67/1023* (2013.01)

(58) Field of Classification Search
CPC .......................... H04L 67/1027; H04L 47/125
See application file for complete search history.

(56) References Cited

U.S. PATENT DOCUMENTS

| | | | | |
|---|---|---|---|---|
| 6,611,872 B1 * | 8/2003 | McCanne | ...................... | 709/238 |
| 6,765,866 B1 * | 7/2004 | Wyatt | ............................ | 370/229 |
| 7,797,426 B1 | 9/2010 | Lyon | ............................ | 709/226 |
| 8,004,971 B1 * | 8/2011 | Szabo et al. | .................. | 370/230 |
| 2002/0024974 A1 * | 2/2002 | Karagiannis et al. | ......... | 370/516 |
| 2004/0246895 A1 * | 12/2004 | Feyerabend | .................. | 370/229 |
| 2008/0291867 A1 * | 11/2008 | Weniger et al. | ............... | 370/328 |
| 2010/0106874 A1 * | 4/2010 | Dominguez et al. | .......... | 710/260 |
| 2011/0158237 A1 * | 6/2011 | McDysan et al. | ............. | 370/392 |
| 2011/0161416 A1 * | 6/2011 | McDysan et al. | ............. | 709/204 |
| 2011/0161494 A1 * | 6/2011 | McDysan et al. | ............. | 709/225 |
| 2011/0161521 A1 * | 6/2011 | McDysan et al. | ............. | 709/246 |
| 2011/0235652 A1 * | 9/2011 | Hillier et al. | .................. | 370/428 |
| 2012/0213210 A1 * | 8/2012 | Thomasson et al. | .......... | 370/337 |
| 2013/0343386 A1 * | 12/2013 | Sankar et al. | ................. | 370/392 |

OTHER PUBLICATIONS

Raj Jain: A comparison of Hashing Schemes for address Lookup in Computer Networks; IEEE Transactions on communications vol. 40, No. 10; Oct. 1992.*

* cited by examiner

*Primary Examiner* — Jay P Patel
(74) *Attorney, Agent, or Firm* — Campbell Stephenson LLP (57) ABSTRACT

A method and apparatus to provide network-wide enhanced load balancing. In one embodiment a first message comprising a first value and an address is generated. The first message is transmitted to a first node via a first communication link. A second message comprising a second value and the address is generated. The first and second values are unequal. The second message is transmitted to the first node via a second communication link. Packets are received, wherein each of the packets comprises the address. A first percentage of the packets are forwarded to a first device via the first communication link, wherein the first percentage is proportional to the first value. A second percentage of the packets are forwarded to a second device via the second communication link, wherein the second percentage is proportional to the second value.

21 Claims, 7 Drawing Sheets

FIG. 1

| Modulus Value | Interface Identifier |
|---|---|
| 0 | 1 |
| 1 | 1 |
| 2 | 1 |
| 3 | 2 |

*FIG. 2A*

| Modulus Value | Interface Identifier |
|---|---|
| 0 | 1 |
| 1 | 1 |
| 2 | 2 |

PROVIDING NETWORK-WIDE ENHANCED LOAD BALANCING

TECHNICAL FIELD

The present disclosure relates to packet forwarding.

BACKGROUND

In packet switched networks, routing is a process of forwarding logically addressed packets from their source toward their ultimate destination through intermediate nodes (e.g., routers) connected together by communication links. Routing typically directs packet forwarding on the basis of routing tables or forwarding tables. A routing table can tell a node that a particular destination can be reached by sending the packet to a node that represents the "next hop" on the way to the final destination. Forwarding tables are most commonly used by nodes to find the proper node interface through which a packet should be forwarded. In contrast to routing tables, forwarding tables are optimized for fast lookup of node interfaces based on packet destination addresses. This disclosure makes reference to routing packets based on forwarding tables, it being understood the disclosure should not be limited thereto.

Routing schemes differ in their delivery semantics. Unicasting, one of the simplest, involves a packet being relayed from node to node along a chain leading from the packet's source to its destination. Broadcasting requires a packet to be duplicated at nodes with the goal of delivering a copy to every device on the network. In practice, packets are not forwarded everywhere on a network, but only to devices within a broadcast domain, making broadcast a relative term. Less common than broadcasting is multicasting, where a packet is selectively duplicated at nodes and delivered to each of a specific set of recipients. Anycast is a scheme in which packets from a source can be routed to the topologically nearest destination in a group of potential destinations, all identified by the same destination address or range of destination addresses.

Interior Gateway Protocol (IGP) can be used to set up Anycast in a local area network. This process may include advertising the same destination address or range addresses from endpoints at different places on the local area network. Anycast can be set up globally (e.g., on the Internet) by using Border Gateway Protocol (BGP). In this process the same destination address or range of addresses is advertized from endpoints at different places on the Internet.

BRIEF DESCRIPTION OF THE DRAWINGS

The present disclosure may be better understood, and its numerous objects, features, and advantages made apparent to those skilled in the art by referencing the accompanying drawings.

DETAILED DESCRIPTION OF EXAMPLE EMBODIMENTS

Overview

A method and apparatus to provide network-wide enhanced load balancing is disclosed. In one embodiment a first message comprising a first value and an address is generated. The first message is transmitted to a first node via a first communication link. A second message comprising a second value and the address is generated. The first and second values are unequal. The second message is transmitted to the first node via a second communication link. Packets are received at the first node, wherein each of the packets comprises the address. A first percentage of the packets are forwarded to a first device via the first communication link, wherein the first percentage is proportional to the first value. A second percentage of the packets are forwarded to a second device via the second communication link, wherein the second percentage is proportional to the second value.

Description

Access to Network Services Using Anycast

A network service is a service hosted on a computer network. Network services are typically hosted by endpoints (e.g., servers) that can be accessed on request by clients via the network. A content delivery network (CDN) is one example of a network service. Today, CDNs provide a large fraction of Internet content, including web objects (text, graphics, URLs and scripts), downloadable objects (media files, software, and documents), applications (e-commerce, portals), live streaming media, on-demand streaming media, and social networks to clients. Some network services have very short transaction times and may be carried out using a single packet request from a client and a single packet reply from an endpoint. Other network services involve far longer-lived transactions that include the endpoint sending multiple packets in reply.

Network services such as CDN are increasingly required to have high availability. The requirements have increased the demands on the reliability of the network infrastructure through which the services are requested. Anycast is a technique that can be used to provide high availability of network services. To illustrate how this can be achieved, presume a group of endpoints that provide the same service are positioned at discreet locations in a network, and all are identified by the same anycast address or range of anycast addresses. Client computer systems on the network can access and use the service by generating and transmitting a packet request with a destination address set to the anycast address. The packet requests can be routed based on the anycast address to the topologically nearest and functioning endpoint of the group. The service provided by each endpoint is generally consistent regardless of the particular endpoint chosen by the routing system to receive the packet request. For ease of illustration, this disclosure will make reference to routing packet requests that are destined for endpoints of one group that provide the same service. The concepts described herein can be employed with routing packet requests destined to endpoints of another group having a different anycast address or range of anycast addresses.

Load Balancing of Requests for Network Services

A network node may have two or more paths for forwarding a packet request to separate endpoints of the anycast group. In some instances, the node may attempt to implement load-balancing in which the packet requests are distributed equally between the separate paths. While the separate endpoints should provide identical replies to the packet requests regardless of how the packet requests are distributed, the endpoints may not be able to provide equal reply times for various reasons including, for example: differences in the speed of endpoint hardware, software or operating systems; differences in endpoint workloads, or; a combination thereof. To account for endpoint reply delays or other factors, it may be better for nodes to unequally distribute packet requests during load balancing. Further, the distribution of packet requests should be dynamic to accommodate changes such as changes in endpoint workloads, network connectivity failures, changes in network policy, changes in network bandwidth use, etc.

Figure 1:
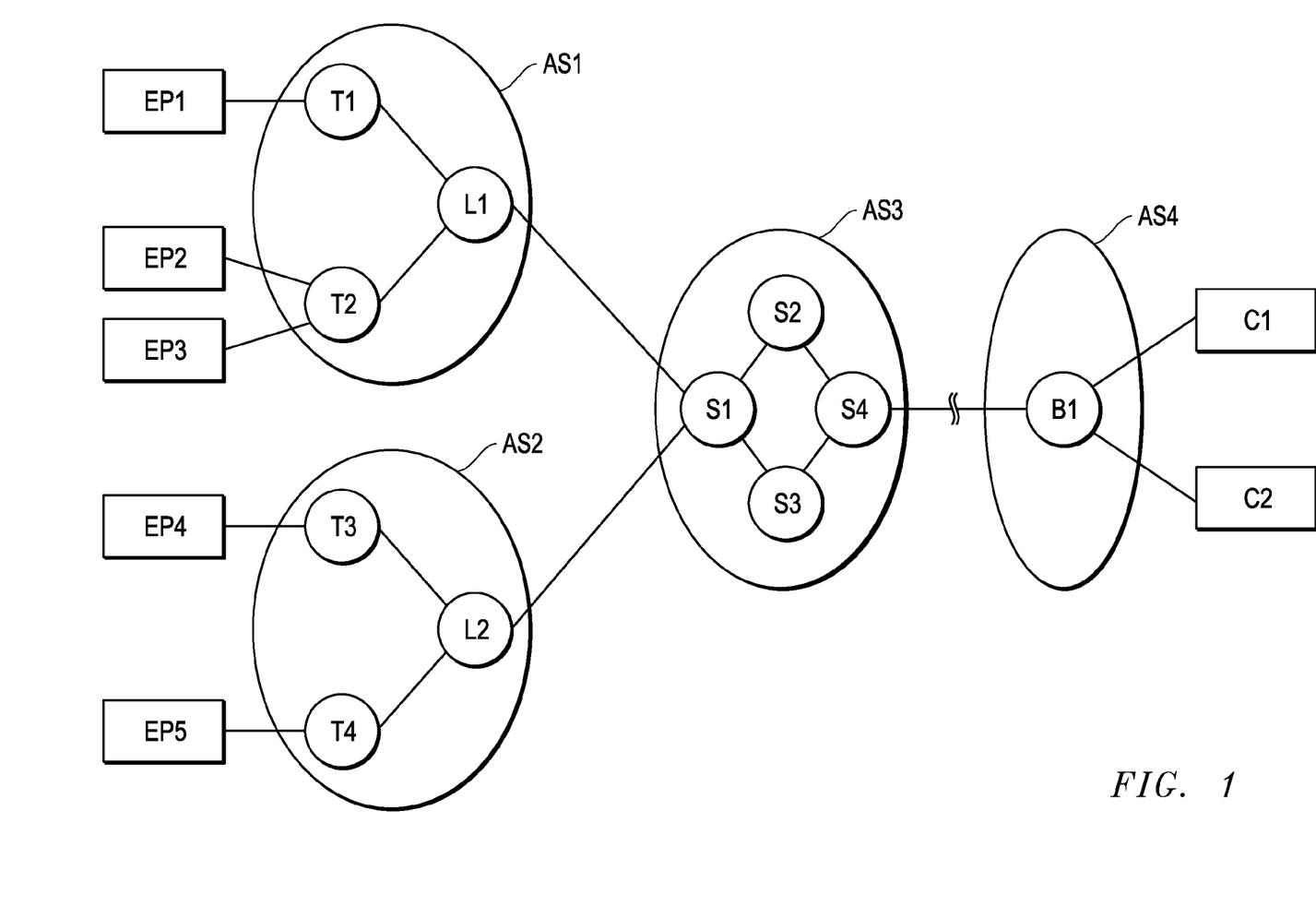
FIG. 1 is a block diagram illustrating an example network.

FIG. 1 illustrates an example network 100 that may be a portion of a larger network such as the Internet. Network 100 includes nodes (e.g., routers, load balancers, etc.) in separate autonomous systems (AS), it being understood the concepts of the disclosure can be applied in a multi-hop or multi-tier network that is within a single AS as well. In FIG. 1, nodes T1, T2, and L1 may be contained in autonomous system AS1 that is distinct from autonomous system AS2, which contains nodes T3, T4, and L2. Nodes S1-S4 and B1 may be contained in separate autonomous systems AS3 and AS4, respectively, as shown.

Network 100 also includes several endpoints EP1-EP5, each of which provides the same network service(s) identified by the same anycast address or range of anycast addresses. Each of endpoints EP1-EP5 may take form in a server computer system (hereinafter "server"). For ease of explanation only, each of endpoints EP1-EP5 is presumed to provide a single network service that is identified by anycast address "A." The service at an endpoint EP1-EP5 can be invoked upon receiving a packet request from a client computer system (hereinafter "client") such as C1 and C2. The packet request may include a header with a destination address set to anycast address A.

Each of the endpoints EP1-EP5 may include a module that can generate load share values based on measured workloads or other factors. The load share values may increase with a decrease in the endpoint's workload, and vice versa. The load share values may be included in routing protocol messages that announce the endpoint's anycast address A. Nodes within network 100 can also generate load share values. As will be more fully described below, load share values can be used for load balancing packet requests for service provided by endpoints E1-E5.

Network 100 is an example of a network with nodes that contain a load balancing service that can equally or unequally distribute packet requests based on load share values or other information. Moreover, as will be fully described below, the load balancing service can dynamically change the distribution of packet requests based on changes in the load share values or other information.

Endpoints EP1-EP5 share the same anycast address A for the common service they provide. The service can be requested via packet requests generated by clients such as clients C1 and C2. Nodes in the network 100 route the packet requests to the best endpoint using a load balancing service. What is considered the best endpoint depends on the configuration of the load balancing service, which can change over time based on load share values generated by endpoints E1-E5 or other information such as network traffic, network policy, etc. To illustrate, at time $t_0$, a load balancing service implemented on node S1 is configured so that 70% of the packet requests received by node S1 from node S2 and/or S3 are forwarded to node L1, while the remaining 30% of the packet requests are forwarded to L2. At a later point in time $t_1$, the load balancing service in node S1 is reconfigured such that 60% of the packet requests received by node S1 are forwarded to node L1, while the remaining 40% of the packet requests are forwarded to node L2.

The load balancing service is not limited to implementation at one node. For example, at time $t_0$, a load balancing service implemented in node L1 is configured so that 75% of the packet requests received by node L1 are forwarded to node T1, while the remaining 25% of the packet requests are forwarded to T2. At the later point in time $t_1$, the load balancing service in node L1 is reconfigured such that 66.6% of the packet requests received by node L1 are forwarded to node T1, while the remaining 33.3% of the packet requests are forwarded to node T2. In similar fashion, at time $t_0$, a load balancing service on node T2 is configured so that 30% of the packet requests received by node T2 are forwarded to endpoint EP2, while the remaining 70% of the packet requests are forwarded to endpoint EP3. At the later point in time $t_1$, the load balancing service in node T2 is reconfigured such that 60% of the packet requests received by node T2 are forwarded to endpoint EP2 for processing, while the remaining 40% of the packet requests are forwarded to endpoint EP3.

Figure 2A:
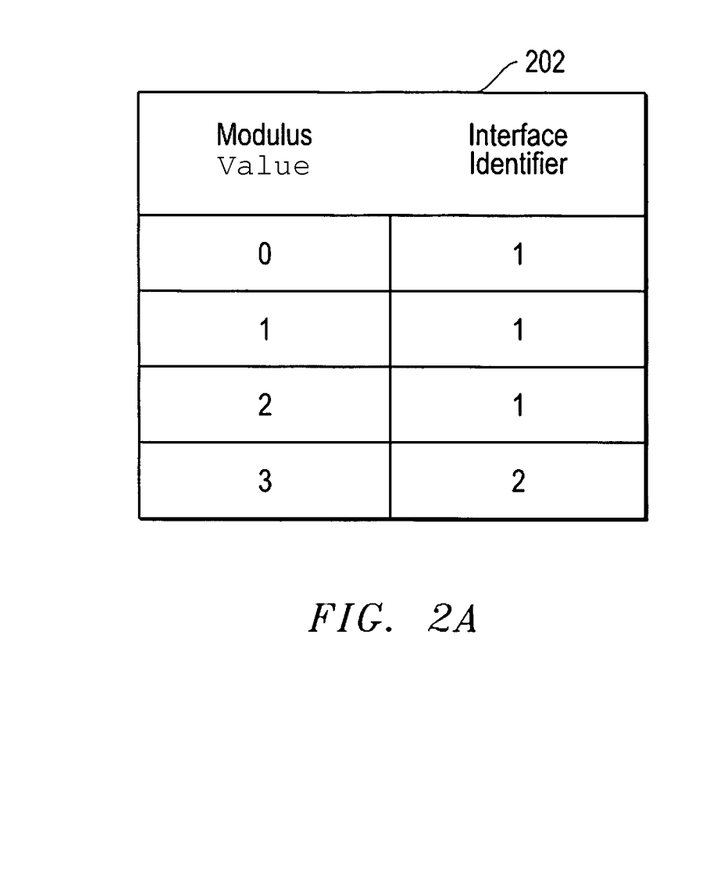
FIGS. 2A and 2B illustrate example extended forwarding tables that can be employed in a node of the network shown in FIG. 1.

Nodes in network 100 may implement the load balancing service using extended forwarding tables with weighted entries in one embodiment. These tables can be used by packet forwarding algorithms to determine how to distribute packet requests. To illustrate, FIG. 2A shows elements of an example extended forwarding table 202 employed in node L1, which is used when distributing packet requests having a header with a destination address set to anycast address A. As will be more fully described below, table 202 is dynamic and can be reconfigured based on a number of factors including the load share values generated by endpoints EP1-EP5, network policy considerations, etc.

An extended forwarding table can map modulus values, more fully described below, to node interfaces for an anycast address in one embodiment. Table 202 maps modulus values to port interfaces of node L1 for anycast address A. It is noted that port interfaces 1 and 2 of node L1 are coupled to nodes T1 and T2, respectively, such that packet requests forwarded to nodes T1 and T2 are sent by node L1 via interfaces 1 and 2, respectively. In the example shown within FIG. 2A, table 202 includes 4 entries, the first three of which map modulus values 0, 1, and 2 to interface 1 of node L1. The last entry maps modulus value 3 to interface 2. The contents of the extended forwarding tables can change over time in order to reconfigure the load balancing service as will be more fully described below.

Figure 3:
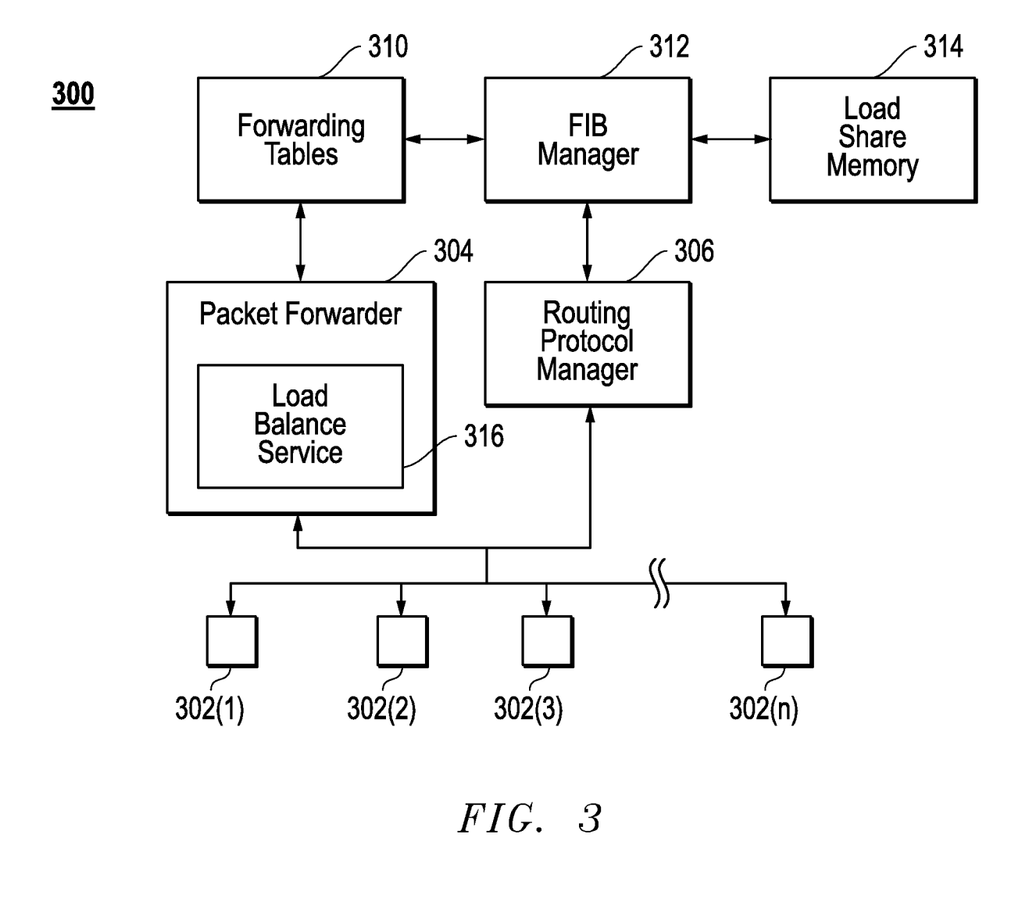
FIG. 3 is a block diagram showing aspects of an example node that can be employed in FIG. 1.

FIG. 3 illustrates in block diagram form example components of a node such as L1, T2, S1, or S4. Node 300 includes interfaces 302 coupled to and in data communication with packet forwarder 304 and routing protocol manager 306. Each of packet forwarder 304 and routing protocol manager 306 may be implemented using a suitable combination of hardware, firmware, and software. In one embodiment, each of packet forwarder 304 and routing protocol manager 306 may be implemented using instructions executing on one or more processors of node 300. Packet forwarder 304 is coupled to and communicates with memory 310, which contains forwarding tables such as table 202 shown in FIG. 2A. Packet forwarder 304 includes a load balancing service module 316 that will be more fully described below. In response to receiving a packet request via one of the interfaces 302, packet forwarder 304 may access a table (e.g., table 202) corresponding to information (e.g., anycast address A) within the header of the packet request to retrieve information (e.g., port interface identity) therefrom.

Routing protocol manager 306 can process routing protocol messages received via interfaces 302. The messages may be from downstream nodes or endpoints and may include advertisements of an address. Some of the routing protocols will announce anycast address A and include a load share value as will be more fully described below. Additionally, routing protocol manager 306 is capable of generating routing protocol messages for subsequent transmission to neighbor nodes via one or more interfaces 302. Some of these messages may also include anycast address A and a load share value generated by node 300.

Node 300 further includes a forwarding information base (FIB) manager 312. FIB manager 312 may be implemented using a suitable combination of hardware, firmware, and software. In one embodiment, FIB manager 312 may take form in instructions executing on one or more processors of L1. FIB manager 312 is coupled to and in communication with routing protocol manager 306 and forwarding table memory 310. Additionally, FIB manager 312 is in data communication with memory 314 that stores load share information including load share values for anycast address A received from downstream nodes or endpoints, and a load share value for anycast address A generated by node 300. FIB manager 312 can configure or reconfigure forwarding tables. For example, FIB manager 312 can add or delete entries to an extended forwarding table such as table 202 shown within FIG. 2A based upon information from routing protocol messages received and processed by routing protocol manager 306. Moreover, FIB manager 312 is capable of storing and/or modifying load store values in memory 314. As will be more fully described below, the load store values within memory 304 can be mapped to identities of interfaces 302 and to anycast address A.

Figure 4:
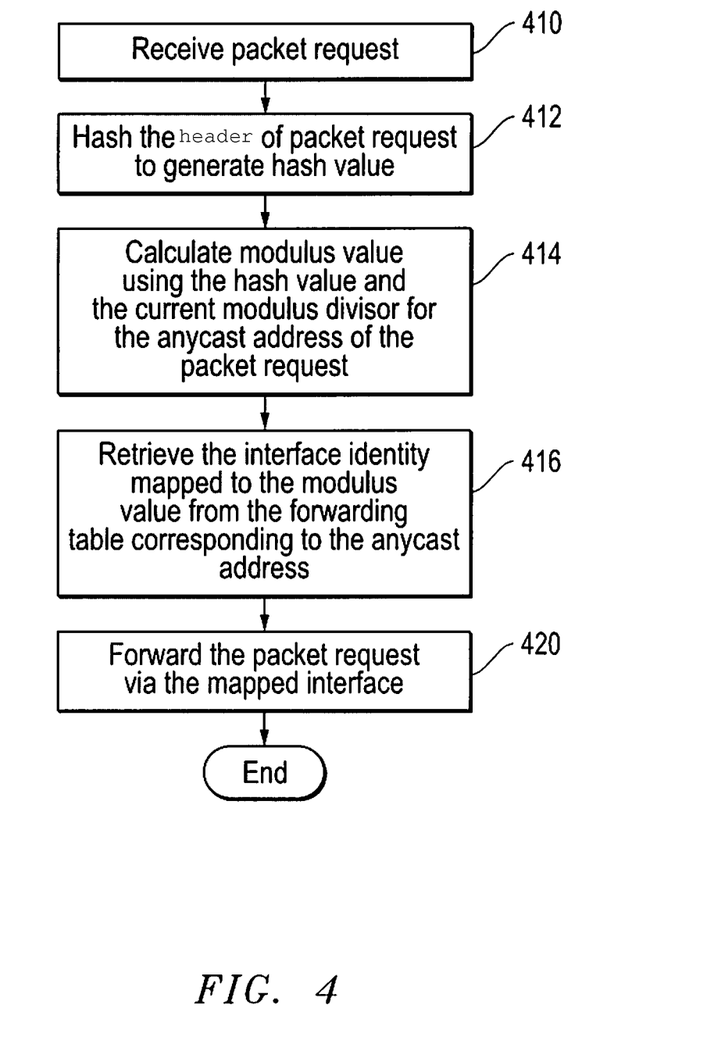
FIG. 4 is a flow chart illustrating aspects of an example process for forwarding packet requests employed in a node of the network of FIG. 1.

FIG. 4 is a flow chart illustrating operational aspects of an example load balancing service implemented by load balancing service module 316. The service shown in FIG. 4 begins when packet forwarder 304 receives a packet request directly from a client (e.g., client C1) or indirectly from a client via an upstream node (e.g., S1). The header of this packet request includes a source address of the client, in addition to destination address A, the anycast address for the service provided by endpoints E1-E5. In one embodiment, load balancing service module 316 hashes the header to generate a hash value. In this embodiment load balancing service module 316 hashes only those headers that contain anycast address A. Load balancing service module 316 then performs a modulo operation on the resulting hash value to generate a modulus value. A modulo operation finds the remainder of division of one number by another. Given two positive numbers, a (the dividend) and n (the divisor), a modulo n (abbreviated as a mod n) is the remainder of the Euclidean division of a by n. For instance, the expression "5 mod 2" would evaluate to a modulus value of 1 since 5 divided by 2 leaves a quotient of 2 and a remainder of 1. The divisor value used in the modulo operation employed by load balancing service module 316 is dynamic and can change as the configuration of the load balancing service changes. The modulus value produced by the modulo operation is used to access a forwarding table such as table 202 in order to retrieve a mapped interface identifier. Once the interface identifier is read from the table, the packet request is forwarded out of that mapped interface.

To illustrate the process shown in FIG. 4 with reference to node L1, suppose node L1 receives a first packet request for the service implemented by endpoints E1-E5. This packet request was originally generated by C1 and includes a header with a destination address A. In response, the load balancing service module 316 of node L1 hashes the header of the packet request to generate a first hash value. The load balancing service module 316 of L1 then performs a modulo operation on the first hash value using a divisor set to 4, which generates a modulus value of 2. The packet forwarder accesses table 202 and retrieves interface identifier 1, which is mapped to modulus value 2. Ultimately, the packet forwarder of node L1 forwards the first packet request to T1 via mapped interface 1 of node L1. To further illustrate, suppose node L1 subsequently receives a second packet request, which was originally generated by another client (e.g., client C2). The header of this second packet request includes a source address of the other client, in addition to destination address A. The header of the second packet request is hashed by the load balancing service module 316 of L1 to generate a second hash value. The load balancing service module then performs a modulo operation on this second hash value with divisor set to 4 to generate a modulus value of 3. The packet forwarder accesses table 202 and retrieves interface identifier 2, which is mapped to modulus value 3. Ultimately, node L1 forwards the second packet request to node T2 via interface 2.

Figure 2B:
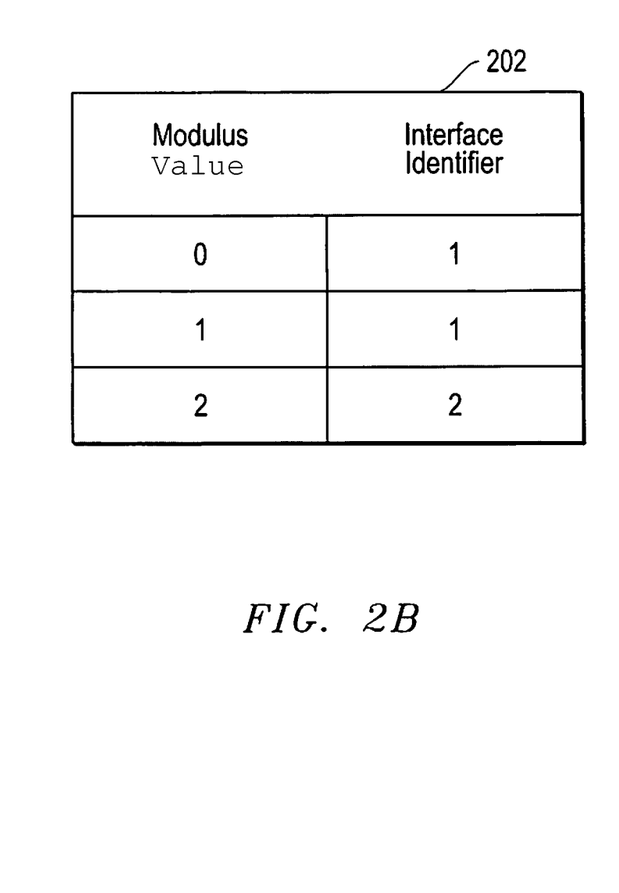

In the example forwarding table 202 of FIG. 2A, there is a 3-to-1 chance that a packet request received by node L1 with destination address A will be forwarded out of interface 1. In other words, node L1 will forward 75% of the packet requests it receives for the service to node T1, while the remaining 25% of the packets requests are forwarded to node T2 . The forwarding tables of the nodes that implement load balancing service are dynamic. FIG. 2B shows forwarding table 202 of FIG. 2A at time $t_1$ which is later than $t_0$. Table 202 has been reconfigured to include 3 entries in which modulus values 0-2 are mapped to interfaces 1 and 2 as shown. It is noted that in addition to reconfiguring the table, the divisor value used by the load balancing service module 316 should also be updated or reconfigured. With three entries, the divisor is updated to a value of 3. The service shown in FIG. 4 can be performed using the reconfigured table and modulo divisor. To illustrate again with reference to node L1 as an example, node L1 receives a packet request from a client at some time later than $t_1$. The load balancing service module 316 of node L1 hashes the header of this packet to generate a hash value. A modulo is performed on this hash value to generate a modulus value of 1. Unlike at time $t_0$, the modulo operation is performed with a divisor of 3. Accordingly, the modulo operation will produce one of three modulus values 0-2. The resulting modulus value is used to access table 202 of FIG. 2B to retrieve the interface identifier mapped thereto. The packet request is then forwarded out the mapped interface. At time $t_1$, there is a 2-to-1 chance that a packet request for the service received by node L1 will be forwarded out interface 1. In other words, 66.6% of packet requests for the service should be forwarded to T1, while the remaining 33.3% of the packet requests should be forwarded to node T2.

The same process described above with reference to node L1 and forwarding table 202 can be similarly employed by the load balancing service modules within nodes L2 , T2 , and S1, each of which may contain distinct forwarding tables with different weighted entries. The operation is not performed in nodes T1, T3, and T4 since these nodes do not have options for forwarding packet requests containing anycast address A.

Figure 5:
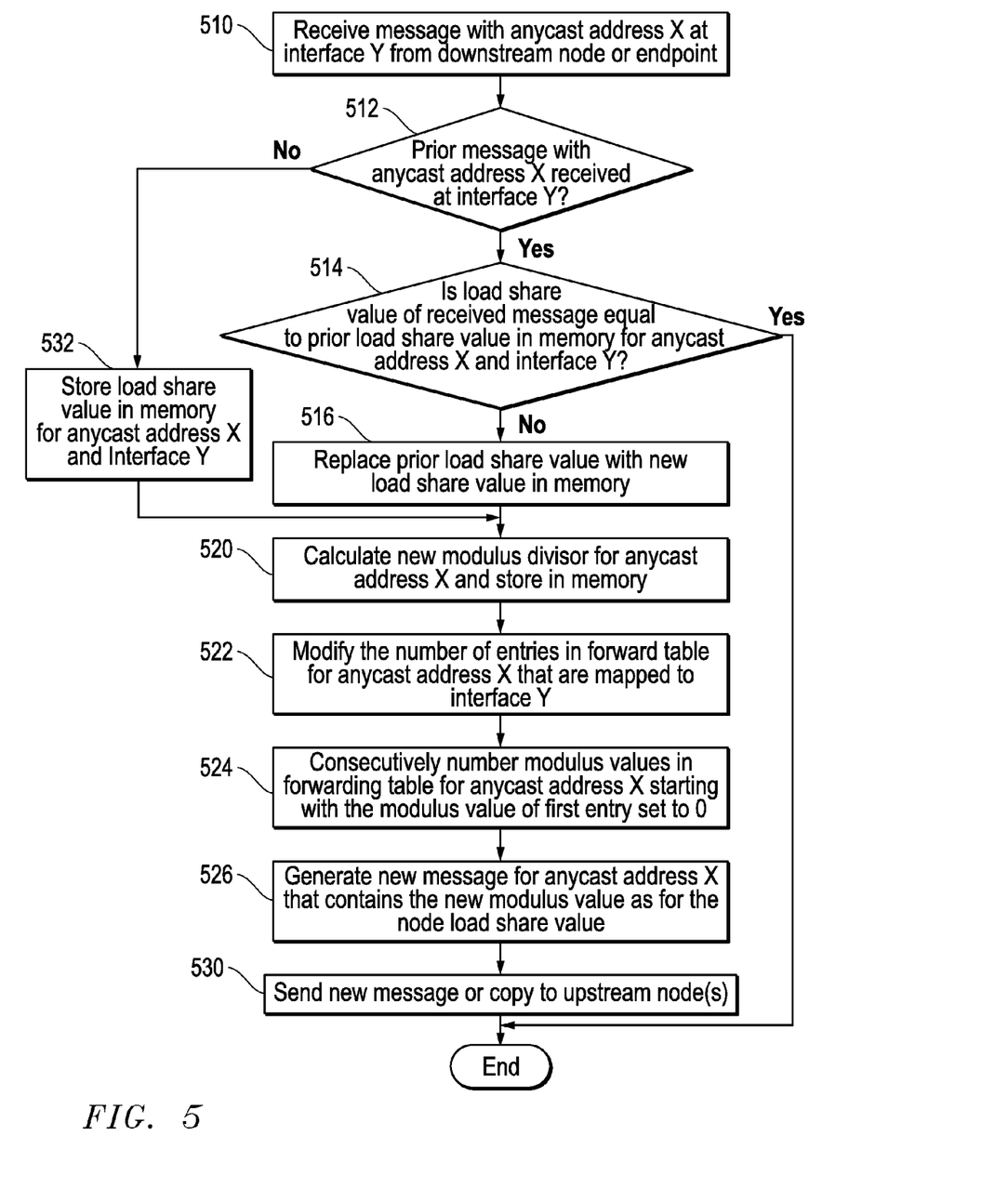
FIG. 5 is a flow chart illustrating aspects of an example process for configuring or reconfiguring a load balancing service employed at a node of the network shown in FIG. 1.

As noted above, the load balancing service implemented by nodes of network 100 can be reconfigured to accommodate changes in the network such as changes in workloads at EP1-EP5 or changes in network policy. In one embodiment, the load balancing service at a node can be reconfigured by reconfiguring the forwarding table such as table 202 and the modulo divisor. FIG. 5 is a flow chart illustrating aspects of an example process implemented by a node such as L1, T2, S1 or S4 for reconfiguring an extended forwarding table and associated modulo divisor. In this illustrated embodiment, the extended table and divisor can be updated based upon information in routing protocol messages (e.g., IGP or BGP announcements) received from downstream nodes or endpoints.

With continuing reference to FIG. 3, the process of FIG. 5 begins when the routing protocol manager 306 receives a routing protocol message at interface Y (e.g., interface 302(1)) that advertises anycast address X (e.g., anycast address A) from a downstream node or endpoint. This message should also contain a load share value that was generated by the downstream node or endpoint. The anycast address X, the interface identifier Y, and the load share value is provided to FIB manager 312 for further processing. FIB manager can determine in step 512 whether a prior routing protocol message for anycast address X was received at interface Y. In particular, the FIB manager 512 can check to see if memory 314 contains a load share value mapped to anycast address X and interface Y to make this determination. If FIB manager 312 determines that a prior message was not received, the message received in step 510 is the first received at interface Y for anycast address X, and process proceeds with FIB manager 312 configuring or reconfiguring the forwarding table (e.g., table 202) in memory 310 for anycast address X. However, if FIB manager 312 determines that a prior routing protocol message was received at interface Y, the process proceeds to step 514 where FIB manager 312 compares the load share value of the message received in 510 with the load store value of the prior message received at interface Y and stored in memory 314. If these two load share values are determined to be equal, the process ends. If different the process will proceed to step 516 where FIB manager 312 replaces the old load share value stored in memory 314 with the new load share value of the message received in step 510. The new load share value is mapped in memory 314 to the anycast address X and interface Y.

In step 520, FIB manager 312 calculates a new modulo divisor for anycast address X, which is subsequently provided to the load balancing service module 316 of packet forwarder 304. The new modulo divisor is calculated by adding all the load share values stored in memory 314 that are mapped to anycast address X. This would include the new value received in the message of 510, but not the old load store value that was replaced in step 516. Thereafter, in step 522, FIB manager 312 modifies the number of entries mapped to interface Y in the forwarding table to reflect the difference in the new and old load store values. For example, if the new load store value is 4 and the old load store value was 2, the FIB manager 312 will add two new entries mapped to interface Y in the forwarding table for anycast address X. In contrast, if the new load store value is 1 and the old load store value was 2, then the FIB manager 312 will remove one of the existing entries mapped to interface Y in the forwarding table for anycast address X.

In step 524, FIB manager 312 consecutively numbers the modulus values in the forwarding table for anycast address X starting with modulus value 0. In other words, the first entry will have its modulus value set to 0, the next entry will have its modulus value as set to 1, etc., until all entries of the table have a modulus value. In step 526, the routing protocol manager 306 will receive a copy of the new modulo divisor from FIB manager 312.

In step 526 routing protocol manager 306 can generate a new routing protocol message for anycast address X that contains the new modulo divisor as its load share value. In step 530, routing protocol manager 306 forwards the new routing protocol message or a copy to an upstream node or nodes. It is noted that protocol manager 306 could adjust the load share value before the new routing protocol message is forwarded to account for changes in additional information such as a change in network policy, network traffic, etc.

In step 512 the message of 510 may be the very first routing protocol message received at interface Y that contains anycast address X. In this case, FIB manager 312, as shown in step 532, stores the load share value of the routing protocol message in memory 314 and maps it to anycast address X and interface Y. Thereafter, the process proceeds to step 520, which is described above.

Endpoint devices EP1-EP5 are each capable of processing a packet request with destination address A. The workloads of the endpoints may vary for many different reasons including a sudden increase or decrease of received packet requests. At any point, any one of the endpoints EP1-EP5 may seek to increase or decrease the number of packet requests it receives due to changes such as changes in workload. Each of the endpoint devices EP1-EP5 may periodically generate a routing protocol message that advertises anycast address A and contains an updated load store value calculated according to, for example, the workload of the endpoint.

Figure 6:
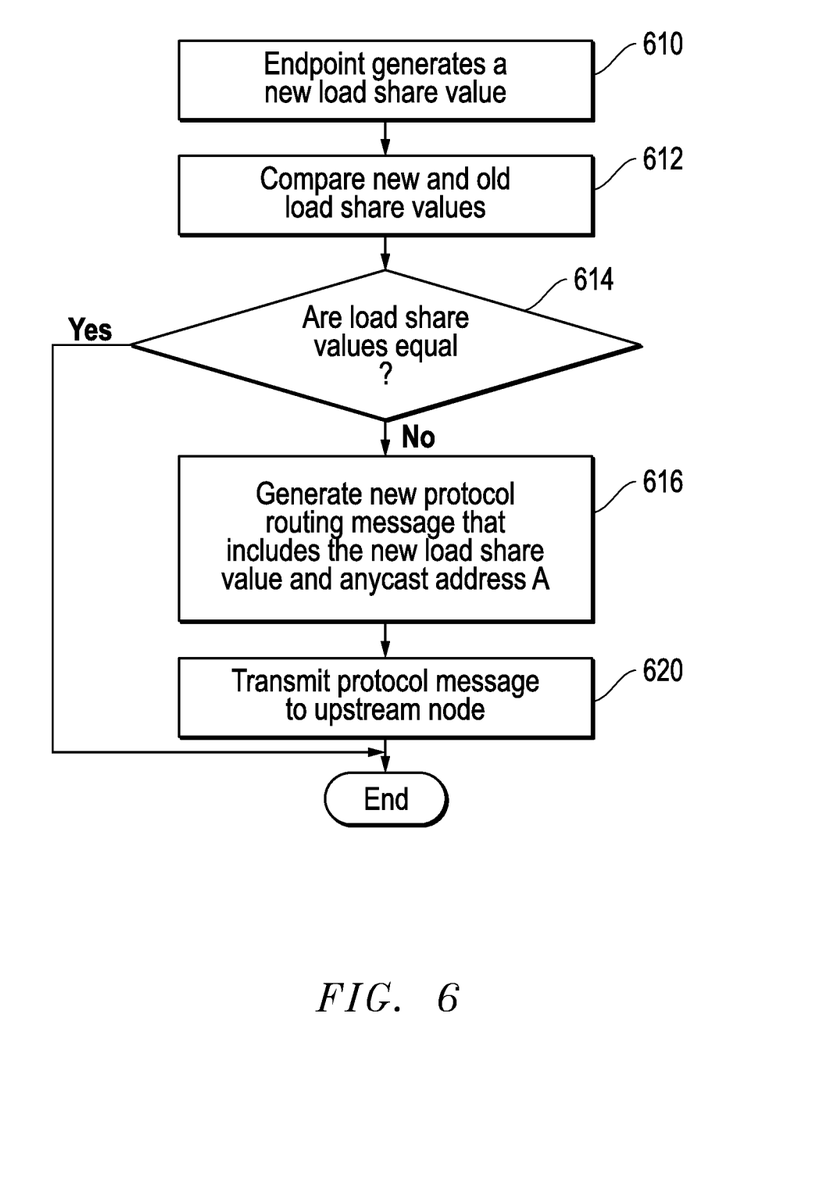
FIG. 6 is a flow chart illustrating aspects of an example process for generating routing protocol messages that can be employed at an endpoint of the network shown in FIG. 1.

FIG. 6 is flowchart illustrating an example process implemented by an endpoint device EP1-EP5 for generating and sending a routing protocol message with a load share value. The process shown within FIG. 6 is implemented each time the endpoint generates a new load share value. The process in FIG. 6 starts with step 602 when the endpoint generates a new load share value corresponding to anycast address A. This new load share value is compared to an old load share value previously generated by the endpoint as shown in step 604. If these two load share values are the same, the process ends. However, if it is determined the new load share value is different, the process proceeds to step 610 where a new routing protocol message is generated that advertises anycast address A. This message will include the new load share value. In step 612, the new message is sent to the upstream node(s) (e.g., T1). Lastly, the old load share value in memory is replaced with the newly generated load share value.

Figure 7:
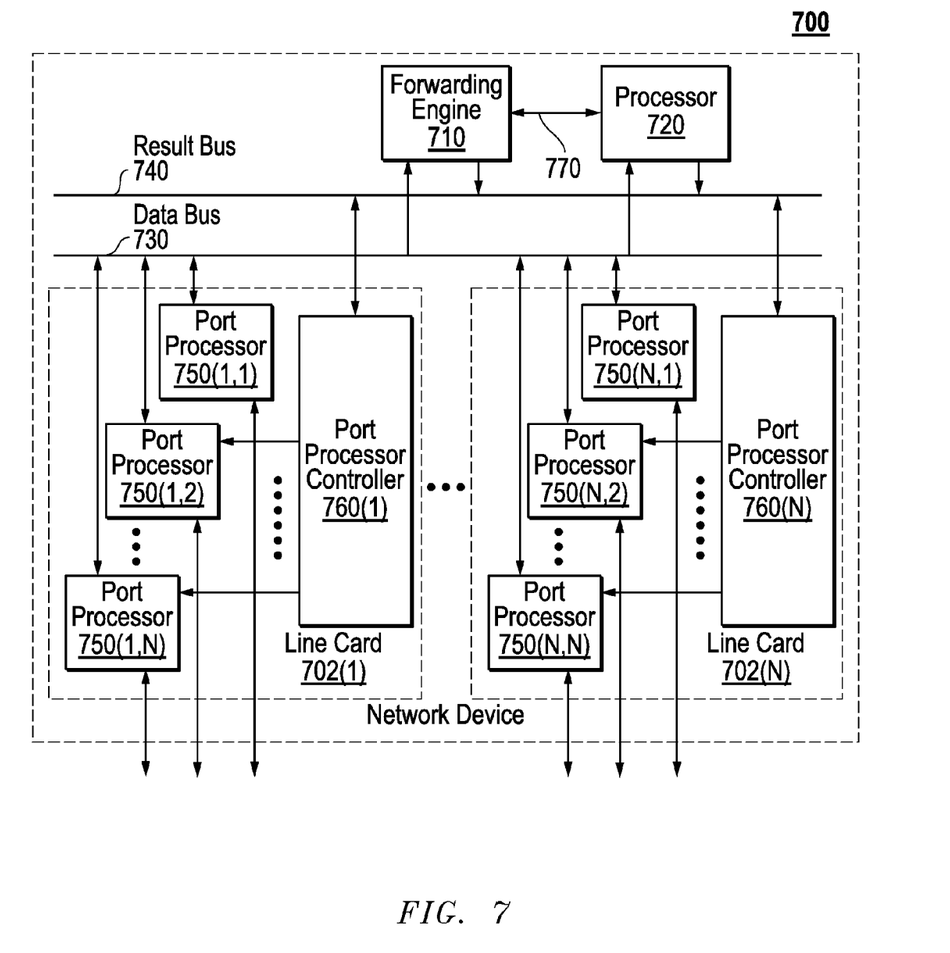
FIG. 7 is a block diagram illustrating components of an example node that can be employed in the network of FIG. 1.

FIG. 3 above illustrate relevant components of node employed in the network of FIG. 1. FIG. 7 is a block diagram illustrating certain additional and/or alternative components of a node that can be employed in the network. In this depiction, router 700 includes a number of line cards (line cards 702(1)-(N)) that are communicatively coupled to a forwarding engine or packet forwarder 710 and a processor 720 via a data bus 730 and a result bus 740. Line cards 702(1)-(N) include a number of port processors 750(1,1)-(N,N) which are controlled by port processor controllers 760(1)-(N). It will also be noted that forwarding engine 710 and processor 720 are not only coupled to one another via data bus 730 and result bus 740, but are also communicatively coupled to one another by a communications link 770.

The processors 750 and 760 of each line card 702 may be mounted on a single printed circuit board. When a packet is received, the packet may be identified and analyzed by router 700 in the following manner. Upon receipt, a packet (or some or all of its control information) is sent from the one of port processors 750(1,1)-(N,N) at which the packet was received to one or more of those devices coupled to data bus 730 (e.g., others of port processors 750(1,1)-(N,N), forwarding engine 710 and/or processor 720). Handling of the packet can be determined, for example, by forwarding engine 710. For example, forwarding engine 710 may determine that the packet should be forwarded to one or more of port processors 750(1,1)-(N,N). This can be accomplished by indicating to corresponding one(s) of port processor controllers 760(1)-(N) that the copy of the packet held in the given one(s) of port processors 750(1,1)-(N,N) should be forwarded to the appropriate one of port processors 750(1,1)-(N,N). In addition, or alternatively, once a packet has been identified for processing, forwarding engine 710, processor 720 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Regarding the example methods described with reference to FIGS. 4-6 and elsewhere throughout this disclosure, although the operations are described in a particular order, the present disclosure contemplates the operations of the method being performed in any suitable order and including the same, fewer, or additional operations, according to particular needs. Additionally, the example methods may include other suitable operations, if appropriate. Furthermore, although particular components may be described as performing particular operations, the present disclosure contemplates any suitable component performing certain operations, according to particular needs.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

I claim:

1. A method comprising:
receiving, at a first node via a first communication link, a first message comprising a first value and an address;
receiving, at the first node via a second communication link, a second message comprising a second value and the address, wherein the first and second values are unequal;
receiving packets at the first node, wherein each of the packets comprises the address;
forwarding a first percentage of the packets to a first device via the first communication link, wherein the first percentage is proportional to the first value;
forwarding a second percentage of the packets to a second device via the second communication link, wherein the second percentage is proportional to the second value.

2. The method of claim 1 further comprising:
receiving, at the first node via the first communication link, a third message comprising the address and a third value, wherein the first and third values are unequal;
receiving additional packets at the first node after the first node receives the third message, wherein each of the additional packets comprise the address;
forwarding, by the first node, a third percentage of the additional packets to the first device via the first communication link, wherein the third percentage is unequal to the first percentage.

3. The method of claim 2 further comprising:
receiving, at the first node via the second communication link, a fourth message comprising the address and a fourth value;
forwarding, by the first node, a fourth percentage of the additional packets to the second device via the second communication link, wherein the fourth percentage is unequal to the second percentage.

4. The method of claim 1 further comprising:
adding, by the first node, the first and second values to generate an added value;
generating, by the first node, a third message comprising the address and the added value;
transmitting, by the first node, the third message to a second node via another communication link.

5. The method of claim 4 further comprising:
receiving, by the second node, a fourth message from a third node, wherein the fourth message comprises the address and a fourth value;
receiving, by the second node, first packets, wherein each of the first packets comprises the address;
forwarding, by the second node, a percentage of the first packets to the first node, wherein the percentage is proportional to the added value;
forwarding, by the second node, a fourth percentage of the first packets to the third node, wherein the fourth percentage is proportional to the fourth value.

6. The method of claim 1:
wherein the address is one of a range of addresses contained in the first message;
wherein the second message comprises the range of addresses.

7. The method of claim 1 wherein first and second servers generate and transmit the first and second messages, respectively.

8. The method of claim 1 further comprising:
hashing a header of one of the packets received at the first node to generate a hash value;
performing a modulo operation on the hash value to generate a modulus value;
accessing a table using the modulus value to retrieve a port interface identifier.

9. The method of claim 1, wherein
the first value comprises a first load share value, and
the second value comprises a second load share value.

10. A network node comprising:
a memory; and
a processor coupled to the memory and configured to:
receive a first message via a first interface of the network node, wherein the first message comprises an address and a first value;
receive a second message via a second interface of the network node, wherein the second message comprises the address and a second value, wherein the first and second values are unequal;
receive packets after receiving the first and second messages, wherein each of the packets comprises the address; and
forward a first percentage of the packets via the first interface, wherein the first percentage is proportional to the first value, and forward a second percentage of the packets via the second interface, wherein the second percentage is proportional to the second value, and wherein the first percentage is unequal to the second percentage.

11. The network node of claim 10 wherein the processor is configured to:
receive additional packets after receiving a third message via the first interface, wherein each of the additional packets comprise the address; and
forward a third percentage of the additional packets via the first interface, wherein the third percentage is unequal to the first percentage.

12. The network node of claim 10 wherein the processor is further configured to:
add the first and second values to generate an added value; and
generate a third message comprising the address and the added value.

13. The network node of claim 10 wherein the processor is configured to transmit the third message to a first network node via a third interface of the network node.

14. The network node of claim 10 wherein:
the address is one or a plurality of addresses;
the processor is configured to:
receive a third message via the first interface, wherein the first message comprises another address and a third value, wherein the other address is one of the plurality of addresses;
receive additional packets after receiving the third message, wherein some of the additional packets comprise the address and some of the additional packets comprise the other address; and
forward a third percentage of the additional packets via the first interface, wherein the third percentage is unequal to the first percentage.

15. The network node of claim 10 wherein the processor is further configured to:
process a header of one of the received packets in accordance with a first function to generate a first result;
process the first result in accordance with a second function to generate a second result; and
access a table using the second result to identify a port interface identifier of the network node.

16. The network node of claim 15 wherein the processor is configured to:
process a header of another of the received packets in accordance with the first function to generate a third result, wherein the first and second results are distinct from each other;
process the third result in accordance with the second function to generate a fourth result; and
access a table using the fourth result to identify another port interface identifier of the network node.

17. The network node of claim 15, wherein the processor is configured to:
process a header of another of the received packets in accordance with the first function to generate a third result, wherein the first and second results are distinct from each other;
process the third result in accordance with the second function to generate a fourth result; and
access a table using the fourth result to identify the port interface identifier of the network node.

18. A computer readable memory comprising executable instructions, wherein a method is performed in response to executing the instructions, the method comprising:
receiving first and second messages via first and second interfaces of a node, respectively, wherein the first message comprises an address and a first value, wherein the second message comprises the address and a second value, wherein the first and second values are unequal;
receiving packets after receiving the first and second messages, wherein each of the packets comprises the address;
forwarding a first percentage of the packets via the first interface, wherein the first percentage is proportional to the first value, and;
forwarding a second percentage of the packets via the second interface, wherein the second percentage is proportional to the second value, and wherein the first percentage is unequal to the second percentage.

19. The computer readable memory of claim 18, wherein the method further comprises:
receiving additional packets after receiving a third message via the first interface, wherein each of the additional packets comprises the address;
forwarding a third percentage of the additional packets via the first interface, wherein the third percentage is unequal to the first percentage.

20. The computer readable memory of claim 18, wherein the method further comprises:
adding the first and second values to generate an added value;
generating a third message comprising the added value.

21. The computer readable memory of claim 20, wherein the method further transmitting the third message to another node.

* * * * *

UNITED STATES PATENT AND TRADEMARK OFFICE
CERTIFICATE OF CORRECTION

| | | |
|---|---|---|
| PATENT NO. | : 9,210,088 B2 | Page 1 of 1 |
| APPLICATION NO. | : 13/834479 | |
| DATED | : December 8, 2015 | |
| INVENTOR(S) | : Rao | |

It is certified that error appears in the above-identified patent and that said Letters Patent is hereby corrected as shown below:

In the claims

Column 11
Line 17, Claim 13, replace: "claim 10" with -- claim 12 --

Signed and Sealed this
Twelfth Day of April, 2016

Michelle K. Lee
*Director of the United States Patent and Trademark Office*